July 26, 1932.  A. E. LOOMIS  1,869,159
TOOL LIFT FOR CULTIVATORS
Filed Jan. 19, 1929  3 Sheets-Sheet 1

Inventor
Allen E. Loomis
By Alex. Lagaard
Attorney

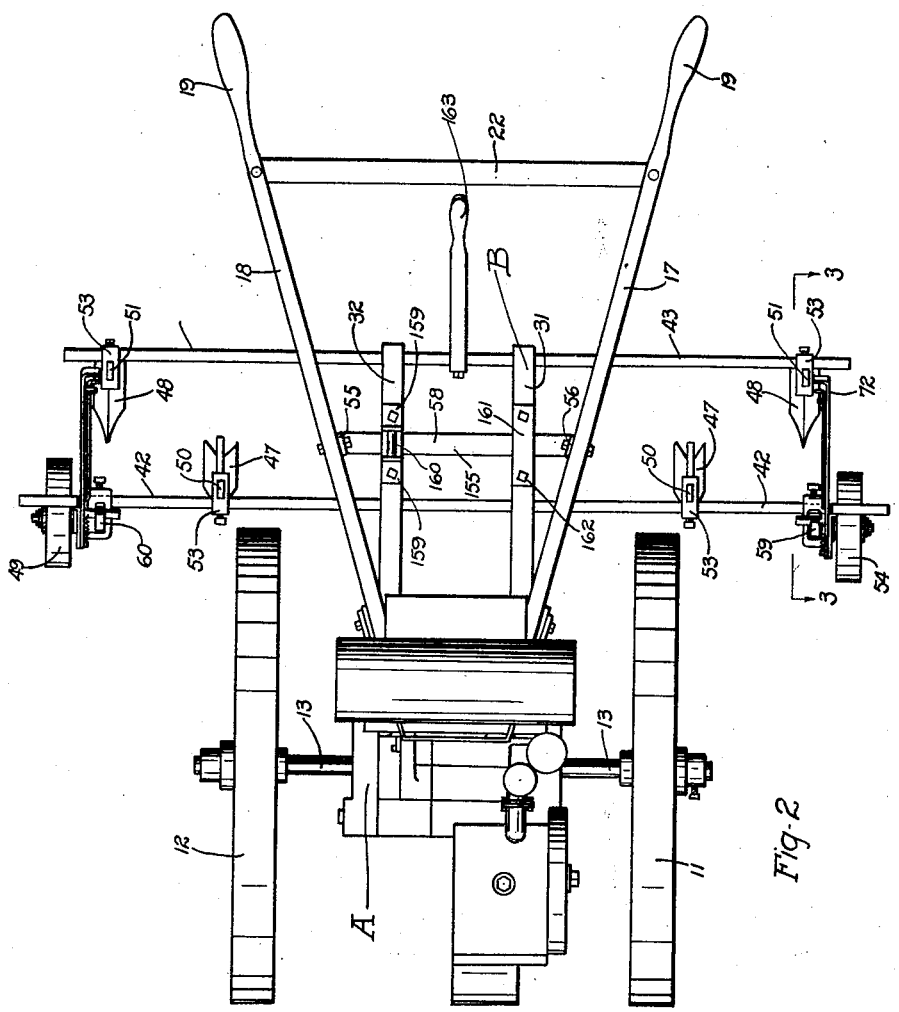

July 26, 1932.  A. E. LOOMIS  1,869,159
TOOL LIFT FOR CULTIVATORS
Filed Jan. 19, 1929  3 Sheets-Sheet 3

Inventor
Allen-E-Loomis
By Alex. Sagaard
Attorney

Patented July 26, 1932

1,869,159

UNITED STATES PATENT OFFICE

ALLEN E. LOOMIS, OF MINNEAPOLIS, MINNESOTA, ASSIGNOR TO AMERICAN FARM MACHINERY COMPANY, OF ST. PAUL, MINNESOTA, A CORPORATION OF MINNESOTA

TOOL LIFT FOR CULTIVATORS

Application filed January 19, 1929. Serial No. 333,536.

My invention relates to tool lifts for cultivators and particularly to devices whereby the depth of the tools of cultivators may be quickly and effectively controlled at will.

An object of the invention resides in providing a supporting structure for the trailer wheels of the cultivator whereby the same may be independently adjusted both vertically and laterally so as to independently vary the depth of penetration and position of the tools on both sides of the cultivator.

Another object of the invention resides in constructing said supporting structure with a post and in attaching thereto a post frame adapted to slide relative to the post and to envelope the same.

A still further object of the invention resides in providing the cultivator with a transverse bar and in slidably mounting upon said bar the post frames in a manner to permit of lateral adjustment of the trailer wheels independent of one another.

Another object of the invention resides in pivoting to the post frame a lever, and in pivoting to said lever a fulcrum adapted to be adjustably connected to said post to permit of raising and lowering said post with respect to the post frame upon oscillation of said lever.

Another object of the invention resides in forming said post with a series of spaced notches and in constructing said fulcrum in the form of an angle having one of the legs thereof pivoted to said lever and the other of the legs thereof extending outwardly from said lever at right angles thereto and adapted to engage within any of said slots for varying the position of the attachment of said fulcrum to the post.

A feature of the invention resides in constructing said frame from a plate-like member having an offset portion and in pivoting said lever to said offset portion between said plate-like member and said post.

A still further object of the invention resides in constructing said plate-like member with a segment and in providing said lever with a keeper adapted to engage said segment for holding said supporting structure in adjusted position relative to the post frame.

Other objects of the invention reside in the novel combination and arrangement of parts and in the details of construction hereinafter described or illustrated.

In the drawings:

Fig. 2 is a plan view of the structure shown in Fig. 1.

In the use of garden tractors for cultivating and similar purposes, it frequently becomes necessary to both adjust the depth of penetration of the tools into the ground and the position of the trailer wheels with respect to the tools, and to make such adjustments independently so as to procure different degrees of penetration at both sides of the cultivator. Such adjustment, and particularly the adjustment of the depth of penetration of the tools into the ground, must be made quickly and frequently when cultivating under varying conditions. My invention provides a simple and effective device whereby these various results can be quickly and positively accomplished.

Figure 1:
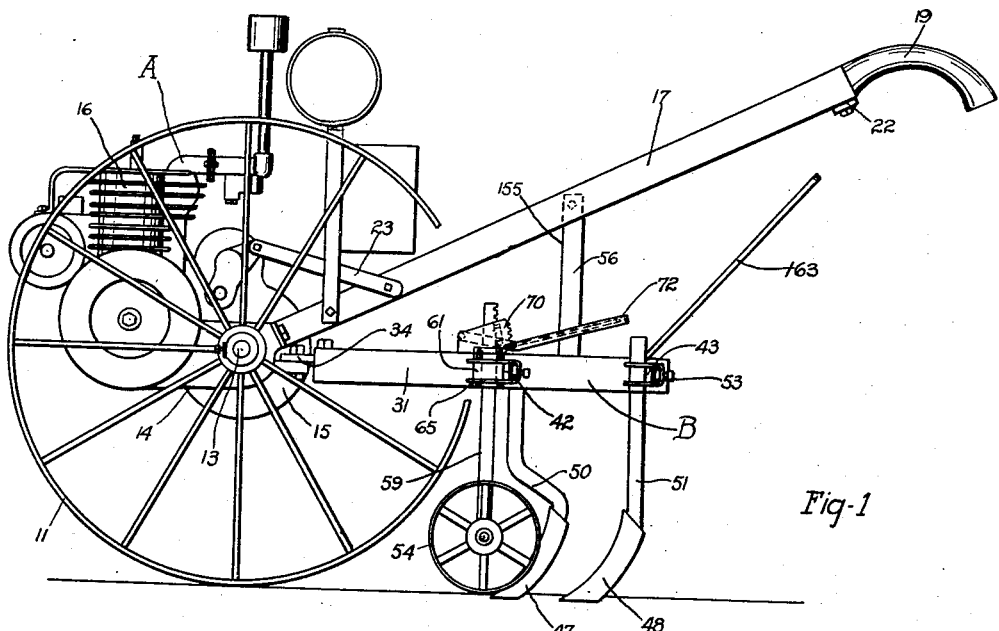
Fig. 1 is a side elevational view of a garden tractor illustrating an embodiment of my invention.

For the purposes of illustrating the application of my invention, I have shown in the drawings an ordinary form of garden tractor which is indicated in its entirety at A in Figs. 1 and 2. This tractor comprises two supporting wheels 11 and 12 carried upon an axle 13. A framework 14 including a transmission case 15 is mounted upon the said axle and carries an engine 16 disposed forwardly of said axle. In conjunction with the frame 14, two steering handles 17 and 18 are employed which are attached to said framework near the axle 13 thereof and which extend rearwardly of and outwardly from said axle in flaring relation to one another terminating in the usual hand grips 19. The upper ends of these handles are held in proper relation to one another by means of a transverse bar 22 which is rigidly bolted thereto. These handles are further braced relative to the framework 14 by means of two braces 23 which are bolted to said handles and to portions of the transmission housing 15.

In conjunction with the tractor proper, a tool supporting framework B is employed which consists primarily of two longitudinal drawbars 31 and 32 which are preferably constructed of channel iron and are pivoted to lugs 34 extending outwardly from the transmission case 15. At the rearward end of the two drawbars 31 and 32 are provided two tool bars 42 and 43 which extend completely through the said drawbars and which are loosely mounted therein to permit of lateral movement of said drawbars with respect to the wheels 11 and 12. These bars may be held in proper relation with respect to the drawbars 31 and 32 by means of cotter pins not shown in the drawings, so that the tool supporting frame structure B may be swung from side to side.

For supporting the rear end of the tool supporting structure B, I employ a depending U-shaped bracket 155 which includes two legs 56 and 57 attached to the handles 17 and 18 of the tractor proper. These legs are formed with a transverse rail 58 which overlies the two drawbars 31 and 32. Upon the upper surface of these drawbars are mounted bearings 159 in which are journaled rollers 160 which engage the undersides of the rail 58 and transmit the thrust from the tools mounted upon said drawbar beams directly to the frame of the tractor. Superimposing these rollers are arranged keepers 161 which are bolted across the bearings 159 and held in fixed position thereon through bolt 162. These keepers ride along the upper surface of the rail 58 and serve to hold the drawbar structure attached to the tractor when the direction of the thrust is reversed. It will be readily comprehended with this construction that the drawbar structure may be readily swung upon the bolts pivoting the drawbars 31 and 32 to the lugs 34, the rollers 60 riding along the underside of the rail 58 and thereby reducing the friction in the shifting of the device.

For shifting the drawbar beams 42 and 43 from side to side, I employ an upwardly extending oblique lever 163 which is rigidly bolted to the rearward beam 43 and extends upwardly at a position to be conveniently manipulated by the operator.

The tools are attached to the drawbar beams 42 and 43 as best shown in Figs. 1 and 2. In these figures I have shown a number of cultivator tools 47 and 48 which are mounted upon posts 50 and 51. These posts are attached to the drawbar proper by means of suitable clamps 53 which permit of adjusting the said tools, both as to height with respect to the tool supporting structure and also laterally along the drawbar beams.

Figure 3:
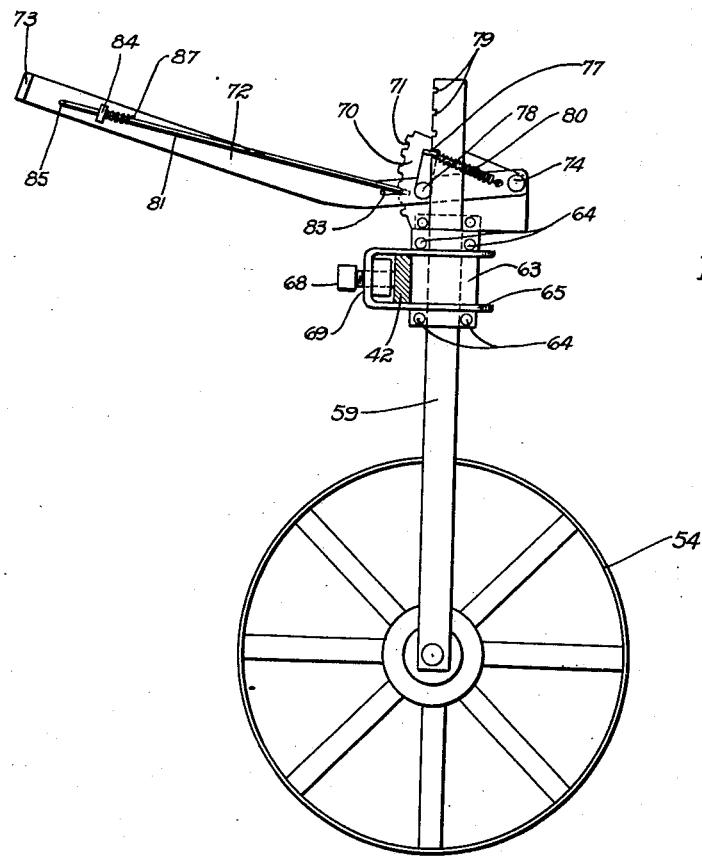
Fig. 3 is an elevational sectional view of the wheel supporting structure taken on line 3—3 of Fig. 2.

In conjunction with the tools 47 and 48, I employ two trailer wheels 54 and 49 which are rotatably mounted upon the ends of posts 59 and 60 best shown in Fig. 2. These posts are adjustably attached to the cross bar or beam 42 so that the same may be both raised and lowered and moved laterally, as the occasion requires. The structure for attaching said posts to the bar 42 being identical for both trailer wheels, only that construction utilized in conjunction with wheel 54 will be described in detail. The post 59 is slidably mounted in a frame structure 61 best shown in Figs. 3, 4 and 5. This frame structure comprises a plate-like member 62 which is adapted to ride along the side of the said post and which has attached to it a second plate-like member 63 by means of a number of rivets 64 securely riveted to both of said plates. These rivets are so spaced as to ride along the forward and rearward edges of the post 59 and in conjunction with the two plate-like members form a box-like structure serving to guide the said post for vertical movement.

The frame structure 61 is attached to the bar 42 by means of a U-shaped clamp 65 which is apertured as indicated at 66 and 67 to permit of the passage of the frame structure 63 therethrough. The distance between the base 69 of the clamp 65 and the edges of the plate-like members 62 and 63 of the frame structure 61, is of such dimensions as to freely receive the bar 42 so as to permit of the sliding of the structure laterally with respect to the same. The frame structure 61 is held rigidly attached to the bar 42 by means of a set screw 68 which is screwed into the base portion 69 of clamp 65. Upon tightening the screw 68 the bar 42 is rigidly clamped against the edges of the plates 62 and 63, as will become evident from Fig. 5.

Figure 5:
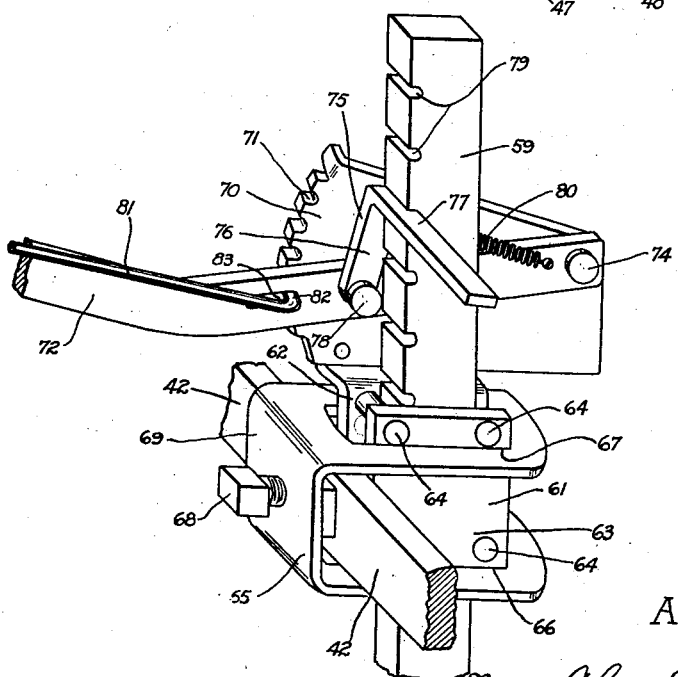
Fig. 5 is a perspective view of the post frame and associated parts.
Figure 4:
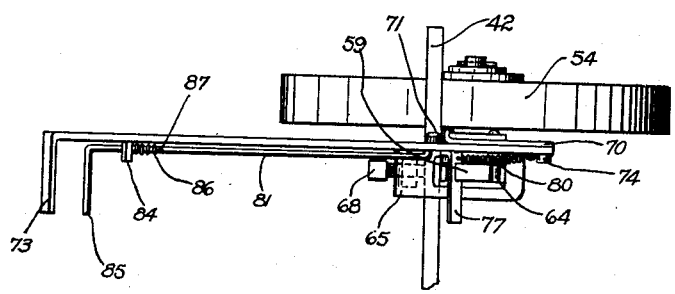
Fig. 4 is a plan view of the structure shown in Fig. 3.

Issuing upwardly from the plate-like member 62 I provide a segment 70 which is offset from the plane of the major portion of said plate-like member 62 and which is spaced from the post 59. This segment is formed along the arcuate edge thereof with a plurality of notches 71 and has pivoted to it a lever 72 at the opposite end thereof by means of a rivet 74, which lever extends rearwardly of the device and terminates in a handle 73 by means of which the same may be manipulated. The lever 72 is disposed between the segment 70 and the post 59, as best shown in Figs. 4 and 5.

In conjunction with the lever 72, I employ a swinging fulcrum 75 which is in the form of an angle having two legs 76 and 77 extending outwardly from one another at right angles. The leg 76 is pivoted to the lever 72 in close proximity to the forward edge of the post 59 by means of a rivet 78 so that the outwardly extending leg 77 thereof may swing toward or from the rearward face of the post 59. The rearward face of the post 59 is constructed with a number of spaced notches 79 which are adapted to receive the leg 77 of the fulcrum 75 so as to hold the same from vertical movement during the operation of the lever 72. It will be noted in Fig. 5 that the leg 77 of fulcrum 75 extends outwardly beyond the side of the post 59 so that the said leg may be manually manipulated when it is desired to withdraw the said leg from engagement with one of the slots 79. Fulcrum 75 is normally held in engagement with the slots 79 through a tension coil spring 80 which is secured to the said fulcrum at a point near the angle thereof and to the lever 72. When the leg 77 of fulcrum 75 is withdrawn from engagement with the slot 79, the entire supporting structure, including the frame 61, may be vertically slid along the post 59 and upon the releasing of said fulcrum, the leg 77 immediately engages one of the slots 79 as the sliding movement continues, after which the frame may be raised and lowered and finally locked in fixed position with respect to the post. Fulcrum 75 not only serves as an adjustment but also serves to compensate for the lateral movement of pivot 78 due to the arcuate movement of lever 72.

The lever 72 may be held in locked position with respect to the segment 70 by means of a rod 81. This rod is constructed with an angular portion 82 which extends through a slot 83 in said lever and which is adapted to be received within any of the notches 71 of the segment 70. Rod 81 is slidably mounted in a lug 84 extending outwardly from the lever 72 near the the handle 73 thereof and may be manipulated by means of a handle 85 formed on the end thereof. A coil spring 86 surrounding the said handle and seated at one end against the lug 84 and at its other end against a pin 87 secured to rod 81, serves to force portion 82 of said rod into engagement with the rod 81 of the segment 70.

In the operation of the device, the handle 85 is drawn toward the handle 73 and the latter lowered and raised to operate the lever 72. Upon the release of handle 85 the rod 81 is caused to engage in one of the notches 71 and thereby locks the lever from further movement.

In the use of the invention the two levers 72 for the respective trailer wheels 54 and 49 are adjusted to mid-position with respect to the segment 70. The fulcrum 76 is next withdrawn from engagement with notches 79 and the entire tractor frame raised and lowered to secure the desired penetration of the cultivator tools 47 and 48 into the ground. The fulcrum 76 for each of the tractor wheels 54 and 49 is next released and engaged within one of the slots 79, holding the wheels 54 and 49 rigidly mounted with respect to the tractor proper. The adjustment of these wheels laterally with respect to the bar 42 is next accomplished by the loosening of the set screw 68 which permits of moving the said wheels with respect to the supporting structure. When these wheels have been properly adjusted laterally, the set screws 68 may be again tightened and the cultivator is ready for use. During the operation of the cultivator, it frequently becomes necessary to vary the depth of penetration of the tools into the ground, particularly where the tools are operating upon relatively hard, dry ground. This may readily be accomplished by manipulation of levers 72. If it is desired to change from shallow to deep penetration or vise versa, the same can be quickly accomplished by the disengagement of the fulcrum 70 of the respective posts 59 and 60 and the reengagement of the same with other of the notches along said posts.

The invention is highly advantageous in that the trailer wheels can be quickly and positively adjusted with respect to the tools and tool supporting frame structure, both laterally and vertically so as to meet with all of the requirements of garden cultivators. By the manipulation of the adjustable fulcrum, adjustment of the wheels through their entire range may be readily had. By the use of a lever in the raising and lowering of the tools with respect to the trailer wheels, the same can be accomplished with a minimum amount of exertion, thereby rendering the operation of the cultivator exceedingly simple and effective. The device can be constructed at a nominal cost and may be made from stampings and by relatively inexpensive methods. The device, though preferably used with garden tractors, may be utilized in conjunction with any type of cultivator or simple implements.

Although I have shown my invention as applied to the posts supporting the trailer wheels of the cultivator, it can readily be comprehended that the invention may be used in conjunction with the posts supporting the tools or other structures of the cultivator.

Changes in the specific form of my invention, as herein disclosed, may be made within the scope of what is claimed without departing from the spirit of my invention.

Having described my invention, what I claim as new and desire to protect by Letters Patent is:

1. In combination with a tool frame of a cultivator having a laterally disposed bar, a post frame slidable laterally along said bar, a post slidable vertically along said post frame, means for locking said post frame from sliding movement upon said bar, and a lever pivoted to said post frame and post for moving said post and frame vertically with respect to one another.

2. A wheel mounting comprising a post, a frame slidable relative to said post, a lever pivoted to said frame, a fulcrum pivoted to said lever, said post being formed with a series of spaced notches, and means on said fulcrum adapted to be engaged by said notches for holding said fulcrum adjustably positioned relative to said post.

3. A supporting device comprising a post, a plate-like member slidable along said post, means for guiding said member in sliding relation with respect to said post, a transverse bar, a U-shaped clamp straddling said bar and enveloping said plate-like member, said clamp being adapted to clamp said bar to said plate-like member, a lever pivoted to said plate-like member, and a fulcrum connected to said lever and post.

4. A supporting device comprising a post, a plate-like member slidable along said post, said plate-like member having a portion thereof spaced from said post, a lever pivoted to said spaced portion of said plate and disposed between said plate and post, and means connected to said post and forming a fulcrum for said lever.

5. A supporting device comprising a post, a frame slidably mounted relative to said post, a lever pivoted to said frame and an angle-shaped fulcrum having one leg thereof pivoted to said lever and the other leg thereof extending at right angles to said lever, said post being formed with a plurality of spaced notches, said outwardly extending leg of said lever being adapted to engage in any of said notches for pivoting said lever.

6. A supporting device comprising a post, a frame slidably mounted relative to said post, a lever pivoted to said frame and an angle-shaped fulcrum having one leg thereof pivoted to said lever and the other leg thereof extending at right angles to said lever, said post being formed with a plurality of spaced notches, said outwardly extending leg of said lever being adapted to engage in any of said notches for pivoting said lever, said outwardly extending leg of said lever extending outwardly beyond the post for providing a handle for the disengagement of said lever with said notches.

7. A wheel mounting comprising a post having a series of spaced abutments, a frame slidable relative to said post, means carried by said frame for sliding said frame, said means including a member movable toward and from said post for engagement with said abutments.

8. A wheel mounting comprising a post having a series of spaced abutments, a frame slidable relative to said post, means carried by said frame for sliding said frame, said means including a pivoted member swingable toward and from said post for engagement with said abutments.

9. A supporting device comprising a post, a frame slidable along said post, said frame including a plate-like member engaging said post and serving as a guide, said plate-like member having an offset portion spaced from said post, a lever pivoted to the spaced portion of said plate and disposed between said plate and post, and means connected to said post and lever for moving said frame relative to said post upon the swinging of said lever.

10. A wheel mounting comprising a post having a series of spaced abutments, a frame slidable relative to said post, means for sliding said frame relative to said post, said means including a member movable toward and from said post, an arm formed on said member for engagement with said abutments, said arm extending outwardly beyond said post to form a finger piece for manually moving the member toward and from said abutments.

11. In combination with the frame of a cultivator, a post frame detachably mounted upon said cultivator frame, a clamp for holding said post frame attached to said cultivator frame, a post slidable relative to said post frame, and means for sliding said post and post frame relative to one another, said means being carried solely by said post frame and being free from said cultivator frame, said means being removable with the post frame upon loosening of said clamp and the removal of said post frame from said cultivator frame.

In testimony whereof I have affixed my signature to this specification.

ALLEN E. LOOMIS.